UNITED STATES PATENT OFFICE.

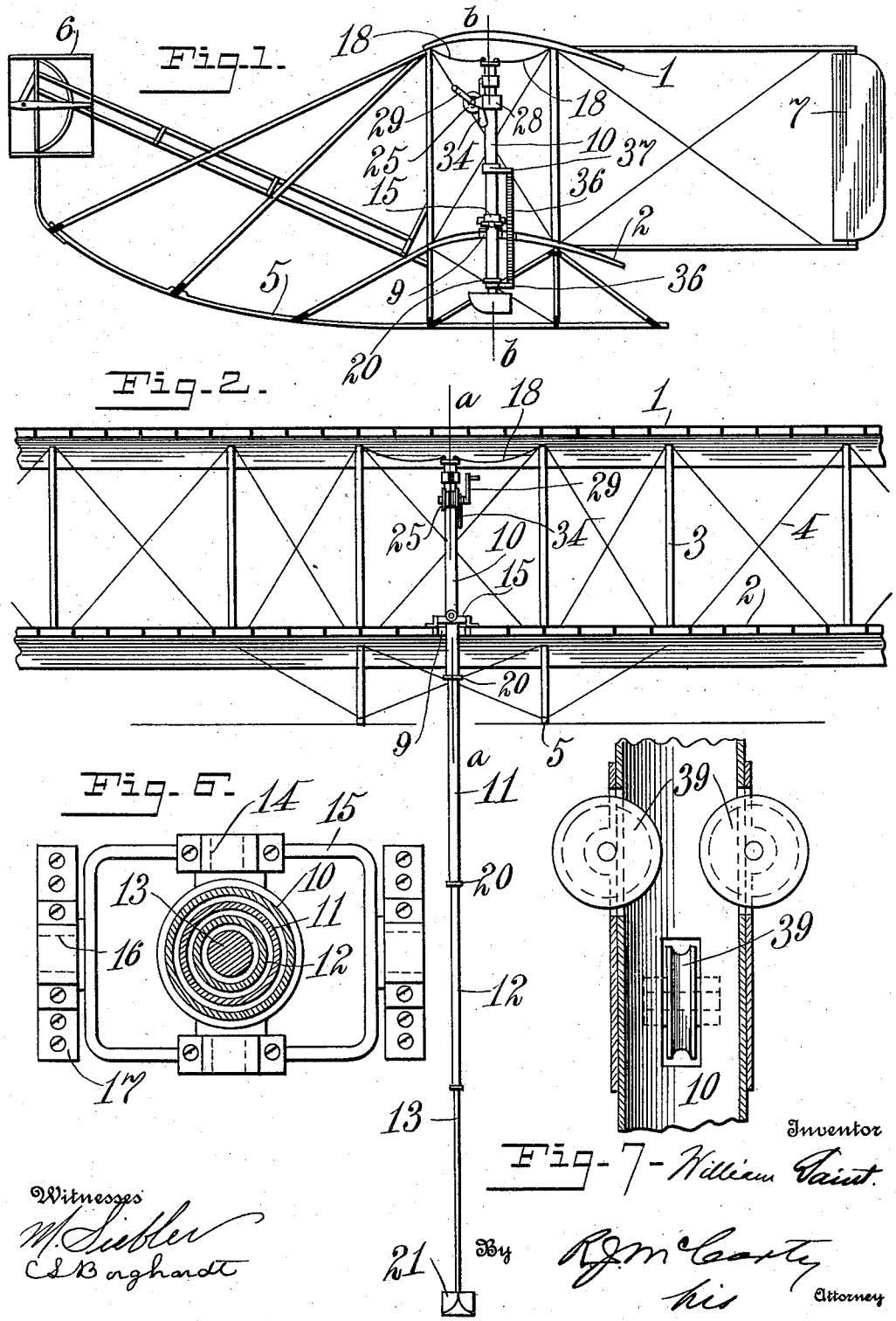

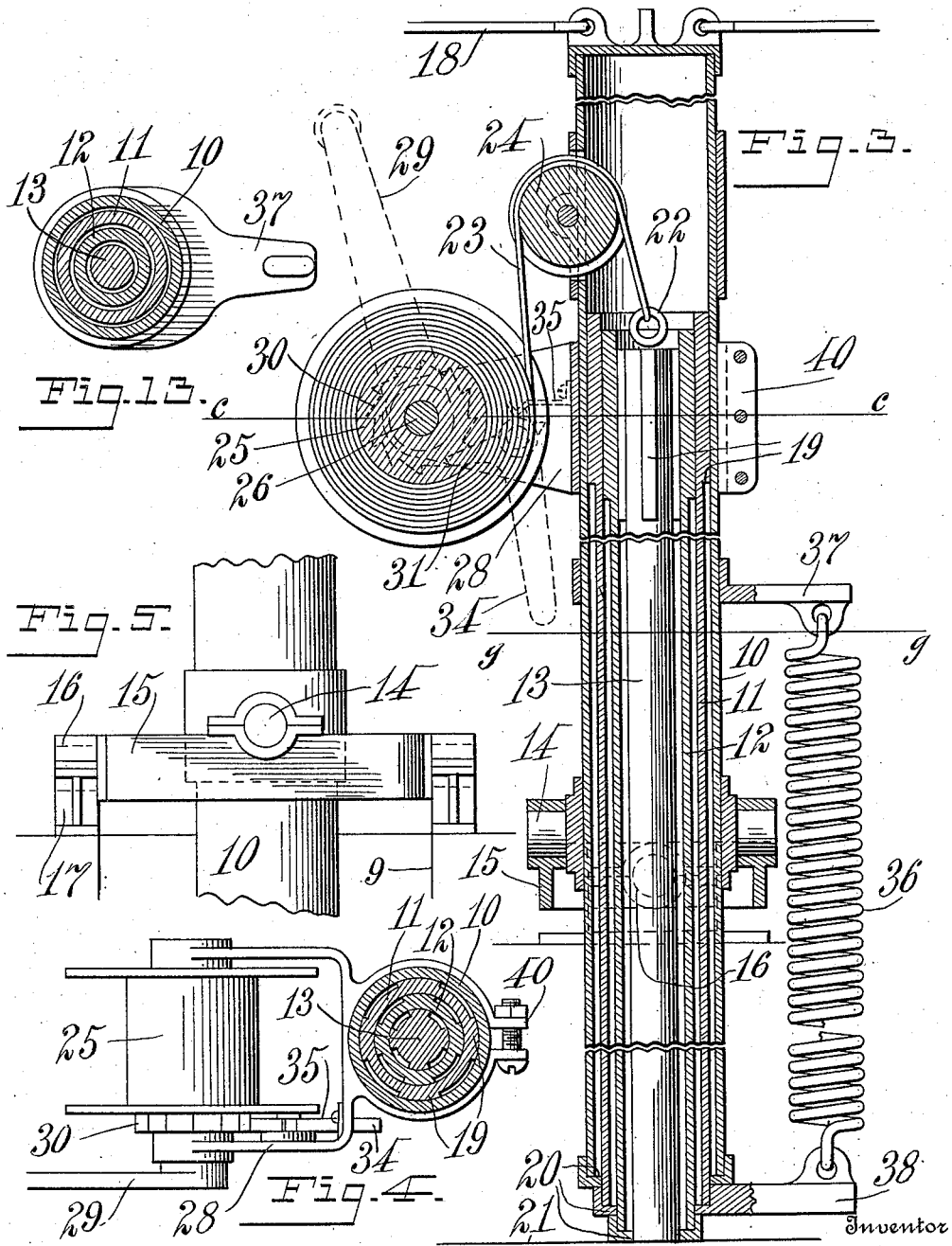

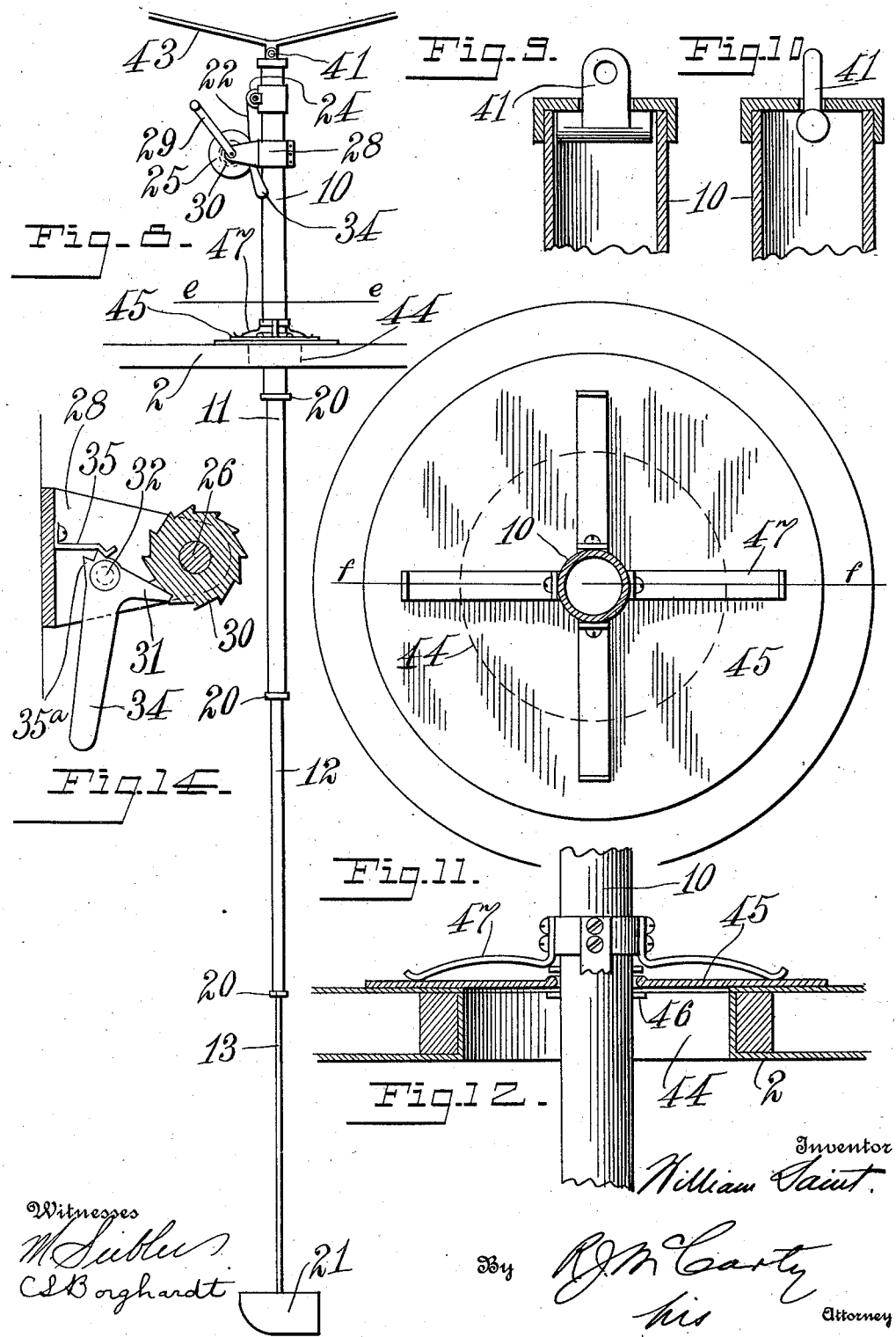

WILLIAM SAINT, OF DAYTON, OHIO.

AUTOMATIC SAFETY DEVICE OR STABILIZER FOR HEAVIER-THAN-AIR FLYING-MACHINES.

1,050,566.      Specification of Letters Patent.      Patented Jan. 14, 1913.

Application filed December 4, 1911. Serial No. 663,693.

*To all whom it may concern:*

Be it known that I, WILLIAM SAINT, citizen of the United States, residing at Dayton, in the county of Montgomery and State of Ohio, have invented certain new and useful Improvements in Automatic Safety Devices or Stabilizers for Heavier-Than-Air Flying-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic safety devices or stabilizers for heavier-than-air flying machines, and has to do particularly with means for balancing the flying machine when in mid-air.

The object of the invention is to provide a device of the above type by means of which a flying machine will be prevented from careening and turning up side down in mid-air, thereby preventing accidents so common in aerial navigation.

Referring to accompanying drawings, Figure 1 is a longitudinal sectional elevation through the center of a flying machine, showing my invention applied thereto, the view being on the line $a$—$a$ of Fig. 2; Fig. 2 is a lateral section on the line $b$—$b$ of Fig. 1, showing the balancing lever in a dropped or extended position. Fig. 3 is a vertical longitudinal sectional elevation through the balancing lever, the same being shown in a telescoped or contracted position; Fig. 4 is a section on the line $c$—$c$ of Fig. 3; Fig. 5 is a front elevation of the universal pivot for the balancing lever shown in Fig. 3; Fig. 6 is a top plan view of Fig. 5; Fig. 7 is a detail sectional view showing a modification of the cable pulleys for operating the balancing lever; Fig. 8 is an elevation of a modified form of balancing lever and devices; Figs. 9 and 10 are detail views of the pivot for the lever shown in Fig. 8; Fig. 11 is an enlarged section on the line $e$—$e$ of Fig. 8; Fig. 12 is a section on the line $f$—$f$ of Fig. 11; Fig. 13 is a section on the line $g$—$g$ of Fig. 3; and Fig. 14 is a detail view of the ratchet which holds the weight in an elevated position.

The aeroplane, to which my invention may be applied, may be of any type, either monoplane or biplane. In the drawings, I have shown the invention applied to a well known type of biplane, which consists of an upper plane 1, and a lower plane 2, which are separated by struts 3 and braced by guy wires 4. In the present case, the aeroplane is mounted on skids 5, and is provided with an elevator 6, and a rudder 7. In aeroplanes of all types, it is found convenient to construct them with a high center of gravity, which permits them to be easily manipulated, while in the air. However, when an aeroplane strikes an " air pocket " or cross current, the high center of gravity is unable to hold the machine in a level position, the machine having a tendency to turn over with serious consequences. To permit the operator of the machine to quickly lower the center of gravity, and to thereby secure a parachute effect, the following balancing device is provided. See Figs. 1, 2 and 3.

The lower plane 2 is provided with an opening 9 in exact vertical alinement with the center of gravity of the machine. Extending through said opening 9 is a telescopic device consisting of an upper and outer tubular member 10, and any desired number of lower and inner members 11, 12 and 13, which may be of any length. The upper outer member 10 is pivoted to the lower plane 2, and is provided with trunnions 14 journaled in a swinging frame 15. The frame 15 is provided with trunnions 16 journaled in bearings 17 attached to the lower plane 2. By this construction, the upper member 10 and the lever as a whole is universally pivoted to the lower plane and may swing in any direction relative to the machine. The upper end of the outer member 10 is connected to any points on the aeroplane, such as the upper ends of the struts 3, by loose or flexible connections 18, which permit the said lever to swing on the pivots or fulcrums 14 and 16, independently of the craft. The inner members 11, 12 and 13 are provided with elongated offsets or lugs 19 adapted to engage flanges 20 on the next adjacent outer members 10, 11 and 12 to limit the downward movement of the inner members, and to hold the members in an assembled position when extended. The lugs 19 are of a length sufficient to hold the lever rigid when extended. The lower end of the extreme inner telescopic member 13 is provided with a weight 21, which together with the inner members 11, 12 and 13, is elevated when the lever is to be placed out of use or telescoped by the following device. The upper end of the inner member 13 is provided with an eyelet 22 to which a cable 23 is attached. The cable 23 extends upwardly and over a sheave 24, journaled on the outermost member 10, and thence downwardly and around a spool 25. The spool 25 is mounted on a shaft 26, journaled in a bracket 28 extending from the member 10, and is provided with a crank handle 29 and a ratchet 30. The ratchet 30 has an operative relation with a pawl 31 pivoted at 32. By means of the handle 29, spool 25 and cable 23, the weight 21 may be elevated to a position above the skids 5 and out of contact with the ground, and will be held in such position by the pawl 31 and ratchet 30. The pawl 31 is provided with an operating handle 34 and is held in a position out of engagement with the ratchet 30 by a spring 35, which engages lugs 35ª. The weight of the handle 34 is sufficient to hold the pawl in engagement with the ratchet.

When the aviator is unable to manage the machine by means of the elevator 6 and rudder 7, and there is danger of the machine turning over, the operator releases the weight 21 by shifting the handle 34 and disengaging the pawl 31 and ratchet 30. The weight 21 will fall by gravity, thereby changing or lowering the center of gravity of the machine. The momentum or impact of the falling weight and telescopic members is arrested by a cushion or spring 36, attached to a bracket 37 extending from the member 10, and to a bracket 38 extending from the member 11. The spring 36 is placed in the rear of the lever as a whole to eliminate unnecessary air resistance. When the weight is in a lowered position, it is adapted to exert a leverage on the machine, which maintains it in a state of equipoise or even balance. When the machine has a tendency to careen to one side, or to the front or rear, the weight will be moved in the opposite direction, and, being under the influence of gravity, will exert a force tending to move the aeroplane to a stable position. The lever, formed by the members 10, 11 12 and 13, may be of any suitable length, and the weight 21 may be of any suitable form or size, which proportions may be determined by the size of the machine. The object in permitting the said lever to have a slight movement independent of the aeroplane, is to permit the aeroplane to be under the control of the elevator 6 and rudder 7, when the machine is flying under ideal or normal conditions, and the weight 21 is lowered. The extent of this independent movement may be varied by adjusting the length of the flexible connections 18. Under some conditions, it would not be necessary to extend the weight to the full length of the lever, in which case the pawl 31 can be thrown in engagement with the ratchet 30 when the lever is extended a sufficient length. When the weight 21 is elevated by the crank 29, the member 12 will be elevated through engagement with the weight, and the member 11 will be elevated through engagement with the flange 20 on the member 12, and thus the system of levers is telescoped. While in the drawings, I have shown the spool 25 manually operated by the crank 29, it will be understood that said spool may be operated to elevate the weight by any well known mechanically or electrically actuated device, such as a motor, operated by a storage battery or the like. The bracket 20 is attached to the member 10 by a clamp 40, which permits the spool 25 to be shifted to different positions to accommodate the position of the aviator. In this case, the member 10 is provided with a plurality of sheaves 39, as is shown in detail in Fig. 7.

In Figs. 8 to 12 inclusive, I have shown a modified form of lever. In this construction, the upper member 10 is provided with a swivel or universal pivot 41 attached to a bracket 43 extending from the upper portion of the machine. The member 10 extends down through an opening 44 in the lower plane 2 which permits the lever to have a slight lateral movement independent of the aeroplane. When the tilting of the aeroplane becomes excessive, the portion 10 of the lever will engage the aeroplane at the perimeter of the opening, and will exert a leverage tending to right the aeroplane in the same manner as the lever shown in Figs. 1 and 2, previously described. The opening 44 is normally closed by a sliding plate 45 held in position by pins 46 and springs 47.

Without limiting myself to the precise arrangement shown and described which may be varied within the scope of the claims, I claim:

1. In a device for the purposes specified, the combination with an aeroplane; of a contractible lever mounted on and extending below said aeroplane, and resilient means mounted on said lever and adapted to cushion the drop of the lever when being extended; and a weight mounted on the lower end of said lever.

2. In a device for the purposes specified; the combination with an aeroplane; of a plurality of telescopic members constituting a lever mounted on said aeroplane, a cable attached to the innermost one of said members, a spool mounted on the outermost member and receiving said cable, means for rotating said spool; and a weight mounted on the innermost member.

3. In a device for the purposes specified; the combination with an aeroplane; of a plurality of telescopic members pivotally mounted on said aeroplane and constituting a contractible and expandible lever; a cable attached to the innermost one of said members; a spool mounted on the outermost member and receiving said cable; means for rotating said spool; and a weight mounted on the lower end of the innermost member.

4. In a device for the purposes specified, the combination with an aeroplane; of a plurality of telescopic members pivotally mounted on said aeroplane; a cable attached to the innermost one of said members; a spool mounted on the outermost members and receiving said cable; means for rotating said spool; a weight mounted on the lower end of the innermost member; and resilient means connecting two of said members and adapted to arrest the force of the weight when the members are extended.

In testimony whereof I affix my signature, in presence of two witnesses.

WILLIAM SAINT.

Witnesses:
R. J. McCarty,
Matthew Siebler.

---

Copies of this patent may be obtained for five cents each, by addressing the "Commissioner of Patents, Washington, D. C."